US008020464B2

(12) United States Patent
Jiang et al.

(10) Patent No.: US 8,020,464 B2
(45) Date of Patent: Sep. 20, 2011

(54) GEAR PAIRS FOR POWER TRANSMISSION IN SPEED INCREASER OR REDUCER AND METHODS OF FORMING THE SAME

(76) Inventors: Hong Jiang, Beijing (CN); Xiaochun Wang, Beijing (CN)

( * ) Notice: Subject to any disclaimer, the term of this patent is extended or adjusted under 35 U.S.C. 154(b) by 677 days.

(21) Appl. No.: 12/093,177

(22) PCT Filed: Oct. 27, 2006

(86) PCT No.: PCT/CN2006/002882
§ 371 (c)(1),
(2), (4) Date: May 9, 2008

(87) PCT Pub. No.: WO2008/011764
PCT Pub. Date: Jan. 31, 2008

(65) Prior Publication Data
US 2008/0282827 A1    Nov. 20, 2008

(30) Foreign Application Priority Data
Jul. 21, 2006  (CN) .......................... 2006 1 0088875

(51) Int. Cl.
F16H 55/08  (2006.01)
(52) U.S. Cl. ........................................... 74/462; 74/437
(58) Field of Classification Search .................. 74/460, 74/462, 457, 455, 459.5, 437
See application file for complete search history.

(56) References Cited

U.S. PATENT DOCUMENTS

| 3,533,300 A | * | 10/1970 | Studer .............................. 74/462 |
| 3,631,736 A | | 1/1972 | Saari |
| 4,051,745 A | * | 10/1977 | Ishikawa ......................... 74/462 |
| 5,271,289 A | | 12/1993 | Baxter, Jr. |
| 6,178,840 B1 | * | 1/2001 | Colbourne et al. ............. 74/462 |
| 7,077,026 B2 | | 7/2006 | Colbourne |
| 2005/0132836 A1 | | 6/2005 | Colbourne |
| 2005/0137420 A1 | | 6/2005 | Schammel et al. |

FOREIGN PATENT DOCUMENTS

| CN | 1096573 | 12/1994 |
| CN | 1488868 | 4/2004 |
| WO | 2005021972 | 3/2005 |
| WO | 2008011764 | 1/2008 |

OTHER PUBLICATIONS

International Searching Authority, "International Search Report," for counterpart PCT Application Serial No. PCT/CN2006/002882 mailed on May 17, 2007 (3 pages).

* cited by examiner

*Primary Examiner* — Richard W Ridley
*Assistant Examiner* — Terence Boes
(74) *Attorney, Agent, or Firm* — Hanley, Flight & Zimmerman, LLC

(57) ABSTRACT

This disclosure relates to a gear pair for power transmission in a speed increaser or reducer and its tooth profile forming method. The tooth profiles of driving gear and driven gear are separately designed from reference points. The upper tooth profiles are composed of conjugate curves, while the lower tooth profiles are composed of smooth convex analytic curves. The reference point of the driven gear is located adjacent the middle of the working depth. The reference point on the tooth profile of the driving gear and the reference point on the driven gear tooth flank are a pair of conjugate points.

19 Claims, 3 Drawing Sheets

GEAR PAIRS FOR POWER TRANSMISSION IN SPEED INCREASER OR REDUCER AND METHODS OF FORMING THE SAME

FIELD OF THE INVENTION

The present invention relates to a kind of gear pair for power transmission, practically relates to the design method of a kind of gear pair for power transmission in speed increaser or reducer that the tooth profile is separately designed from the reference points on tooth surfaces and its forming method.

BACKGROUND ART

Up to now, nearly all the tooth profiles used in automobile transmission train are involute. In order to improve the load capacity of the gear pair, X-gear pairs and optimization in parameters are widely used. However, involute tooth profile has its inherent defects: undercut and large profile curvature when the tooth profile approaches the base circle or base cone for a gear with less number of teeth, thus further improvements in bending and contact strength are limited. For the bevel gear used in differentials, the tooth break caused by insufficient bending strength is the main style of the fail in gearing, so peoples always prefer to choose a gear pair with less number of teeth and larger module in order to get a higher load capacity. Limited by involute tooth profile, it is difficult to design a pair of gears with the sum of the number of teeth in the gears being less than 22, which limits a further improvement in gear strength.

The most commonly used non-involute tooth profile is cycloid profile. Although the undercut problem is eliminated and a transmission with less number of teeth can be realized, its bending strength is rather poor, and the contact strength near the pitch line is not good, being very sensitive to mounting errors, so the cycloid profile is now limited to the transmission of movement such as in watches and clocks, cannot be used for power transmission.

SUMMARY OF INVENTION

The technical problem to be solved in present invention is to provide a method to form the tooth profile for power transmission for speed increaser and reducer so that the gear pair design and the choice of the number of teeth in a gear pair will no longer be limited by undercut, meanwhile the problem that the tooth profile curvature is increased and contact strength is reduced for the contact points approaching the root in involute tooth profile is eliminated, so that the load capacity can be greatly increased for the same structure size.

For a gear pair with a large difference in the number of teeth between driving and driven gears, X-gear pairs are generally adopted, i.e. for the gear with less number of teeth, the difference between the radius of tip and pitch circles is larger than that of the gear with more number of teeth, thus the pitch point is no longer in the middle of the working depth. If the center of the profile crowing is chosen to be the pitch point, it is possible to generate an excursion in contact area, leading to contact defects such as centralized contact stress in local area.

Based upon above analysis, to solve the problems in present invention, the tooth profiles of both the driving and driven gears are divided into upper and lower parts from the referent point on the tooth profile, and the upper and lower parts of each profile is designed to be of different kind of curves. The reference point on the driven gear tooth flank coincides with the split point between upper and lower parts of profiles, which is designed to locate near the center point of the working depth of tooth profile. The technical solution of present invention is:

The present invention provides a kind of gear pair for power transmission in speed increaser or reducer, comprising a pair of engaged driving and driven gears, the profiles of said driving and driven gears are respectively divided into upper and lower parts along respective reference points on tooth flanks. Said reference point of the driven gear is located near the center point of the working depth of the gear pair, and the reference point on driving gear tooth flank and the reference point on driven gear tooth flank are a pair of conjugate points. The lower part profiles of both driving and driven gears are composed of convex analytic curves, while the upper part profiles are composed of conjugate curves by a series of points obtained from engagement equation based on required kinematical regularity.

The present invention also provides a method to form the profiles of gear pairs for power transmission in speed increaser and reducer, which involves a set of steps comprising: 1) Selecting initial position of the reference point on driven gear tooth flank, the pressure angle at the reference point, the curve of driven gear lower part tooth flank, and the relative angular acceleration $\epsilon$ of driven gear with respect to the driving gear when the gear pair are engaged at the reference point.

2) According to given parameters on the driven gear tooth flank, calculating the position vector $\overline{R}_G$ of the reference point on driven gear tooth flank, further the position vector $\overline{R}_P$ of the reference point on driving gear tooth flank and the common unit normal $\overline{n}$ of the reference points when the reference points become a pair of contact points, and curvature radius $\rho_P$ of the driving gear tooth flank at the reference point, thus the convex analytic curve with which the lower part tooth flank of the driving gear can be determined.

3) Calculating tooth profile curves by a series of points in the upper part tooth profile of both driving and driven gear tooth flanks based on gear engagement equation.

Having finished the step 3), an analysis of the composed tooth profiles could be further carried out, so that parameters such as overlap coefficient between adjacent tooth pairs, tip and root width of both driving and driven gears, maximal relative curvature between driving and driven gear tooth flanks, and the maximal and minimal pressure angles are calculated.

If the result from analysis is not satisfied, the originally selected parameters in step 1) can be modified, and repeat steps 1), 2) and 3) again. If necessary, above mentioned steps 1), 2) and 3) can be repeated for several times to obtain satisfied result.

In a preferred example of the present invention, the working depth $h_G$ of present invention for power transmission in speed increaser or reducer can be expressed as $$h_G = (R_{0G} + R_{0P} - A)/2,$$

where $R_{0G}$ represents the tip radius of the driven gear, $R_{0P}$ represents the tip radius of the driving gear, while A represents the center distance of the gear pair.

In a preferred example of the present invention, the radius of the reference point on driven gear tooth flank $R_{GR}$ can be expressed as follows:

$$R_{GR} = R_{0G} - h_G/2 + \Delta h,$$

where $\Delta h$ represents the modification in the radius of the reference point of driven gear, and the codomain of $\Delta h$ is between $-0.07\, h_G$ and $0.07\, h_G$.

In a preferred example of the present invention, in order to reduce the sensitivity of the performance of the gear pair to its mounting errors, the said upper and lower tooth profiles of the driven gear have the same tangent and tooth profile curvature at the split point, i.e. the reference point on the tooth flank, that means the tooth profile of the driven gear is second order continuous at the reference point, both sections of different curves composing a smooth and complete driven gear tooth flank. The said upper and lower tooth profile of the driving gear also have the same tangent and tooth profile curvature at split point, i.e. the reference point on the tooth flank, that means the tooth profile of the driving gear is also second order continuous at the reference point, composing a smooth and complete driving gear tooth flank.

In a preferred example of the present invention, the tooth profile curvature $\rho_P$ can be calculated by using an equation as follow:

$$\frac{1}{\rho_P} = \frac{\overline{P}_{12} \cdot \overline{P}_{12}}{S_{12}} - \frac{1}{\rho_G},$$

where $\rho_G$ represents the curvature radius of the driven gear tooth flank at the reference point, $$\overline{P}_{12} = \overline{n} \times \overline{\omega}_{12} - \overline{v}_{12}/\rho_G$$

$$s_{12} = \overline{v}_{12} \cdot \overline{P}_{12} + \overline{n} \cdot \overline{q}_{12},$$

where $$\overline{q}_{12} = \epsilon \overline{a}_1 \times \overline{R}_P + \overline{\omega}_{12} \times (\omega_2 \overline{a}_2 \times \overline{R}_G) - \overline{a}_2 \times \overline{v}_{12},$$

in which $\overline{v}_{12}$ represents the relative sliding speed between tooth flanks, $$\overline{v}_{12} = \overline{a}_1 \times \overline{R}_P - \omega_2 \overline{a}_2 \times \overline{R}_G,$$

where $\overline{a}_1$ and $\overline{a}_2$ represent the unit vectors of driving and driven gear axes respectively, $\omega_2$ represents the instantaneous angular speed of the driven gear with respect to the driving gear when the reference point gets into contact, i.e. instantaneous speed ratio of the gear pair;
where the instantaneous speed ratio of the gear pair at the reference point $\omega_2 = N_P/N_G$,
$N_P$ represents the number of teeth in driving gear, while $N_G$ represents the number of teeth in driven gear, wherein $$\overline{\omega}_{12} = \overline{a}_1 - \omega_2 \overline{a}_2,$$

where $\overline{\omega}_{12}$ represents the relative angular velocity between the driving and driven gears.

In a preferred example of the present invention, since there is a crowing in tooth profile, when the contact between the gear flanks is out of the reference point, the instantaneous gear ratio is a little different from the reciprocal of the ratio between the number of teeth in gear pair, which means the driven gear has an angular acceleration $\epsilon$ with respect to the driving gear. To obtain required crowning, when the contact between the driving and driven gears is out of the reference point, the instantaneous gear ratio $\omega_2$ can be expressed as follows:

$$\omega_2 = \phi_P \cdot N_P/N_G + \epsilon \cdot \phi_P^2/2$$

where $\epsilon$ represents the angular acceleration of the driven gear relative to the driving gear, and $\phi_P$ represents the angle of rotation of the driving gear.

In a further preferred example of the present invention, to ensure a convex profile, $\epsilon$ must be a negative value, while its absolute value will increase together with the increment in the number of teeth in driving gear. The domain of said angular acceleration of the driven gear with respect to driving gear could be between 0 and −0.0015.

In a preferred example of the present invention, the said convex analytic curve with which the lower part tooth profile of either driving or driven gear is composed can be a single convex analytic curve. The single convex analytic curve can be a circular or elliptic arc.

In a preferred example of the present invention, the said convex analytic curve can also be composed of two pieces of analytic curves. Concretely, it can be composed of a circular arc and its tangent, or composed of an elliptic arc and its tangent. The split point of two pieces of analytic curves is beneath the effective working area of tooth profile, thus the root width is increased and bending strength is improved, while the working situation and sensitivity to mounting errors are kept unchanged.

The effect of this invention is obvious: 1) since the tooth profiles of both driving and driven gears are composed of a piece of convex analytic curve and a piece of conjugate curve with the split point coincide with the reference point, the undercut problem is completely avoided, and gear load capacity is improved. For those applications where the transmission efficiency is not a sensitive factor to the gear pair such as the differential gears in automobile transmission system, a scheme of larger module and less number of teeth can be adopted, the bending strength can be greatly increased caused by an significant increment in root width.

2) The pressure angle of the gear pair changes is no longer a constant, but changes along with the tooth profile, increasing towards the tip of the gear. This is also favorable to the bending strength, for a tooth of a gear can be approximately considered as a cantilever which bears both bending and compress stress, and when its tip part profile gets into contact, the bending stress reaches the maximum. However, if the profile near the tip has a larger pressure angle, the tangent force generated by torque transmission will generate a larger compress stress in the tooth, thus the tensile stress in the root of tensile side is decreased, and the fatigue life is enhanced.

3) For differential gear pairs, a scheme of less number of teeth and larger module in gear pair can be adopted. Larger addendum will increase frictional work between tooth flanks, which may lead to some restriction to the slip of driving wheels in case the vehicle is running on slippery road surface. When a vehicle brakes, it also has some restriction to sideslip. On the other hand, the bevel gears used in differentials for automobiles are manufactured by means of precision forge, so the adoption of non-involute profile will not influence the manufacturing art. For the application in gear box, although the design method of using less number of teeth and larger module is no longer suitable to be adopted, the advantage of higher bending and contact strength provided by present invention is still of great availability.

DESCRIPTION OF PRACTICAL EMBODIMENT

Figure 1:
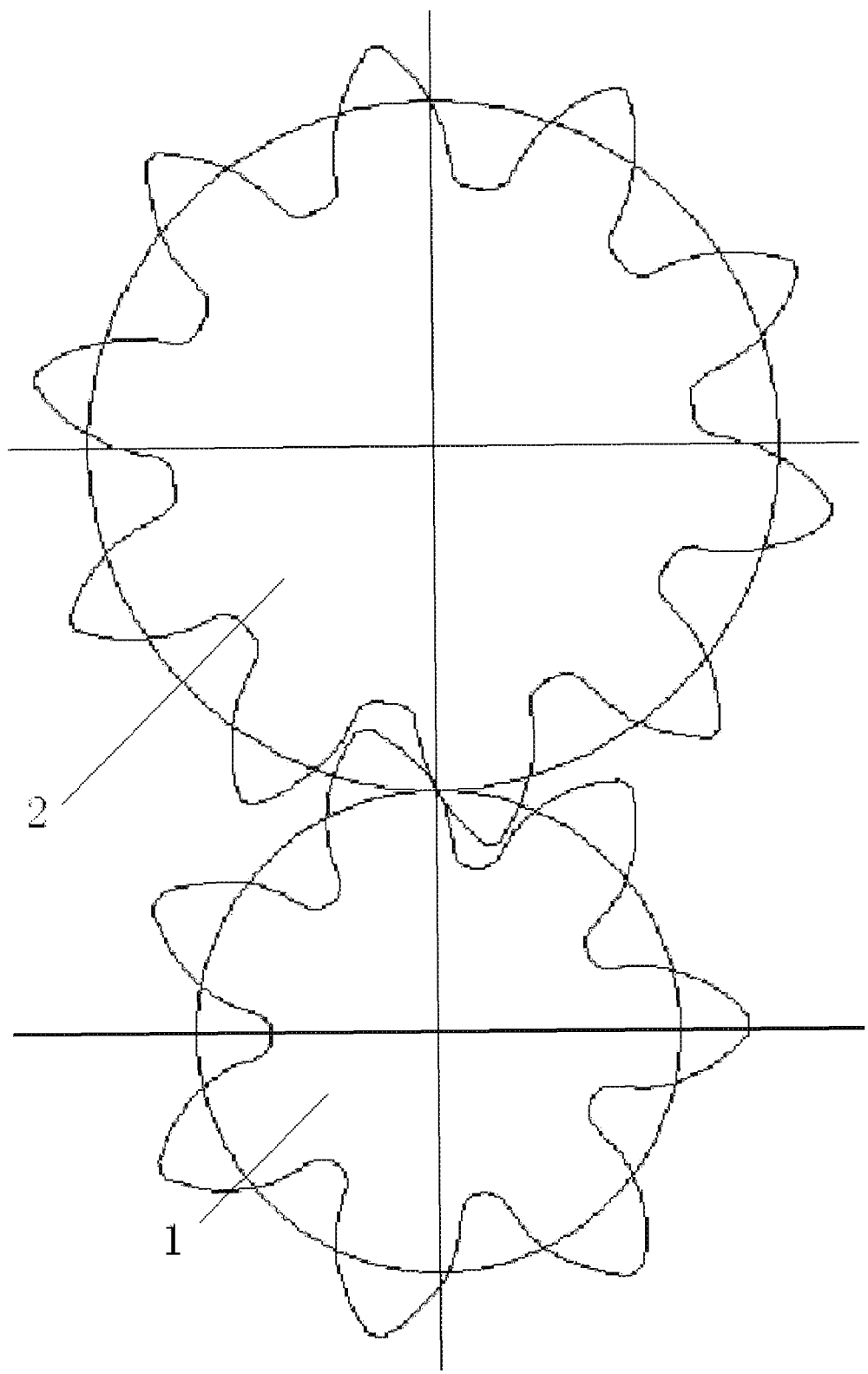
FIG. 1 is a schematic end view of the structure of high-strength gear pair according to present invention.
Figure 2:
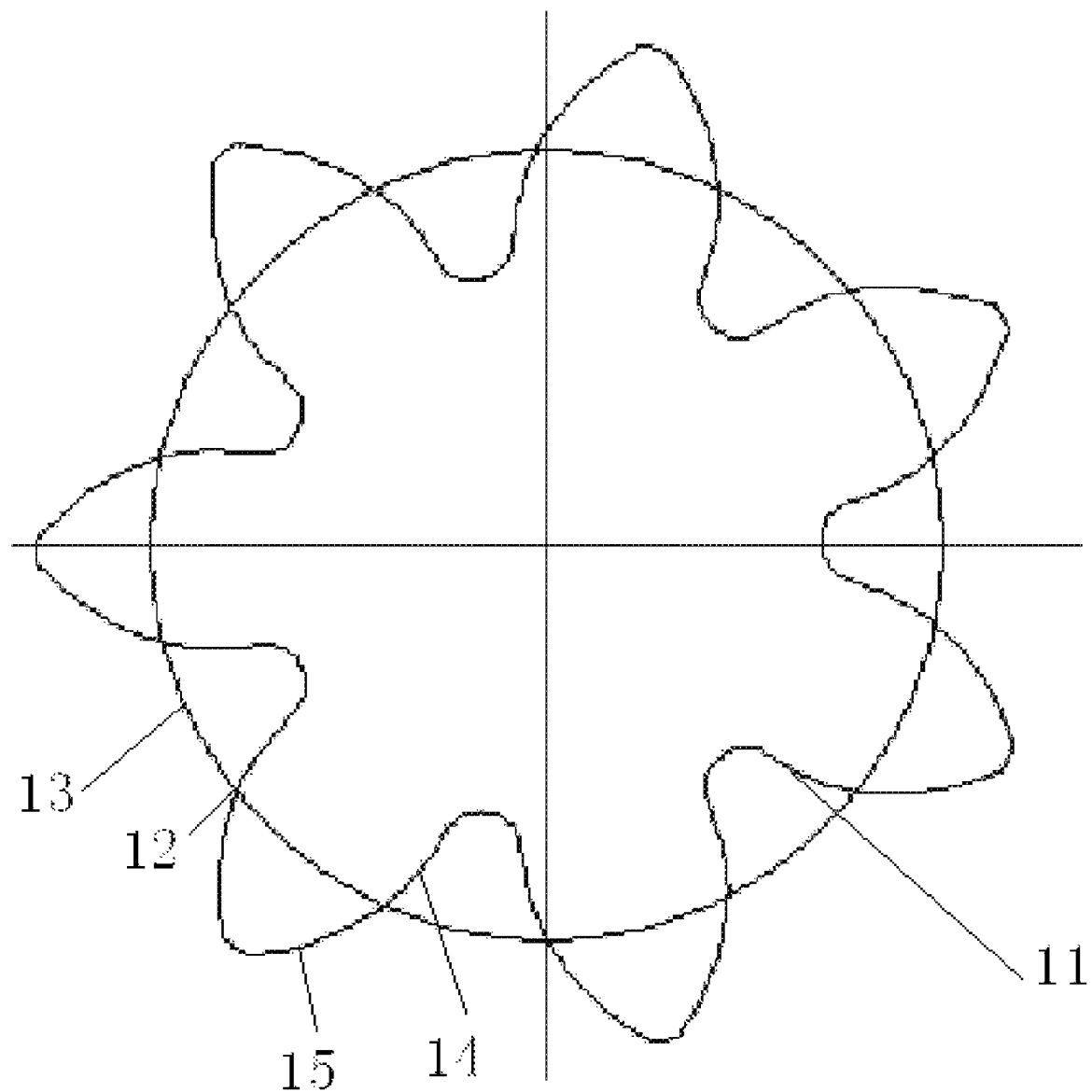
FIG. 2 is a schematic end view of the structure of the driving gear according to present invention.
Figure 3:
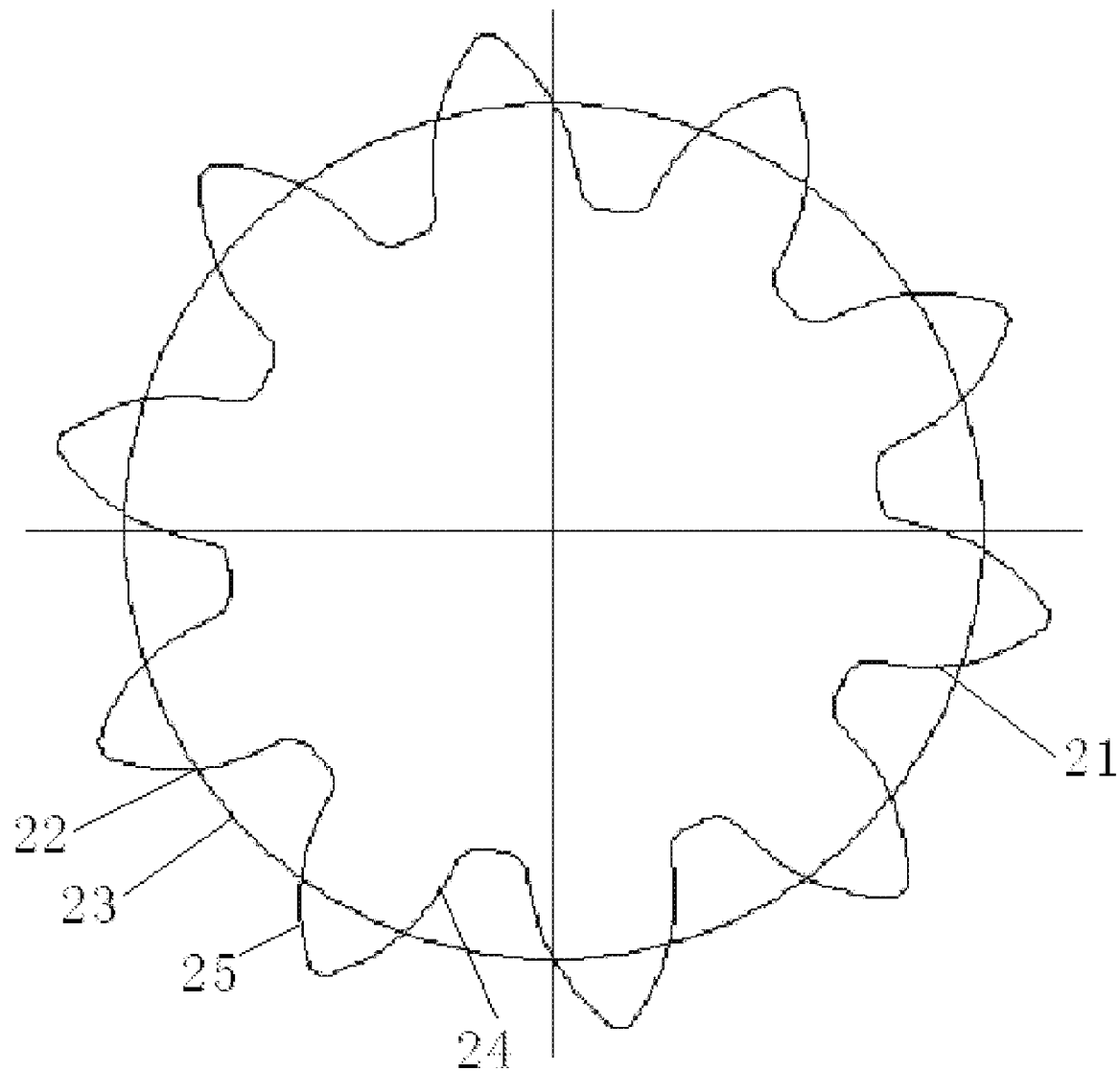
FIG. 3 is a schematic end view of the structure of the driven gear according to present invention.

As illustrated in FIGS. 1 to 3, a kind of gear pair for power transmission in speed increaser or reducer according to present invention comprises at least a pair of engaged high-strength driving gear 1 and high-strength driven gear 2, both profiles of said driving gear 1 and driven gear 2 are divide into upper and lower profiles from respective reference points, the reference point 22 of said driven gear 2 situates near the middle point of working depth. The reference point 12 on the tooth flank 11 of driving gear 1 and the reference point 22 on the tooth flank 21 of driven gear 2 are a pair of conjugate contacting points. During engagement, when the reference point 22 on driven gear tooth flank 21 becomes a contact point, the corresponding contact point on driving gear tooth flank 11 is known as the reference point 12 of driving gear tooth flank. As illustrated in FIG. 2, the tooth profile 11 of high-strength driving gear 1 is divided into lower profile 14 and upper profile 15 by the circle 13 which passing through the reference point 12 on the tooth flank 11. Among the profile sections, the lower profile 14 is composed of analytic curve, while the upper profile 15 is composed of conjugate curves by a series of points obtained from engagement equation. As illustrated in FIG. 3, the tooth profile 21 of high-strength driven gear 2 is divided into lower profile 24 and upper profile 25 by the circle 23 which passing through the reference point 22 on the tooth flank 21. Among the profile sections, the lower profile 24 is composed of analytic curve, while the upper profile 25 is composed of conjugate curves by a series of points obtained from engagement equation.

A method to form tooth profiles of the gear pair for power transmission in speed increaser or reducer is also provided in present invention, which comprises steps as follows:

1) Selecting initial position of a reference point 22 on driven gear tooth flank 21, pressure angle at the reference point, the type of curve which forms tooth profile of a driven gear lower part tooth flank 24, and the relative angular acceleration $\epsilon$ of driven gear 2 with respect to the driving gear 1 when the reference points 12 and 22 of the gear pair are in contact.

2) According to given parameters of driven gear 2, calculating the position vector $\overline{R}_G$ at the reference point 22 on tooth flank of the driven gear 2, the position vector $\overline{R}_P$ at the reference point 12 on tooth flank of the driving gear 1, and the common unit normal $\overline{n}$ when the reference points 12 and 22 become a pair of contact points, and further the curvature radius $\rho_P$ of the driving gear tooth flank at the reference point 12, thus the curvature of the convex analytic curve which forms the lower part tooth flank 14 of the driving gear 1 is determined.

3) Calculating curves that compose the upper part tooth profiles 15 and 25 of both driving gear 1 and driven gear 2 by series of points based on gear engagement equation.

Having finished step 3), an analysis of the composed profiles such as calculating overlapping coefficient, the tip and root width of both driving and driven gears, the maximal relative curvature between the driving and driven gear tooth flanks, and the maximal and minimal pressure angles is carried out. If the result from the analysis is not satisfactory, the originally selected parameters in step 1) can be modified, and repeat steps 1), 2) and 3) again. If necessary, above mentioned steps 1), 2) and 3) can be repeated for several times to obtain satisfied tooth profiles.

The problem of undercut in gear pairs is totally avoided in present invention, thus the load capacity is enhanced. For the application where the transmission efficiency is not a sensitive factor for the gear pairs such as those used in automobile differentials, a scheme of less number of teeth and larger module can be adopted. By means of greatly increasing tooth root width, the bending strength is obviously improved. On the other hand, since the pressure angle is no longer a constant, but changes along the addendum, increasing approaching the tip of the tooth, leading to increased bending strength and longer fatigue life.

For the application in differentials, this invention allows to adopt less number of teeth and larger module, which will increase the friction work between conjugating tooth flanks, leading to some restriction to the slip of driving wheels in case one of them is running on slippery road surface. When a vehicle brakes, it also has some restriction to sideslip.

The working depth $h_G$ of present invention for power transmission in speed increaser or reducer can be expressed as $$h_G = (R_{0G} + R_{0P} - A)/2,$$

where $R_{0G}$ represents the tip radius of the driven gear, $R_{0P}$ represents the tip radius of the driving gear 1, while A represents the center distance.

For present invention, the radius $R_{GR}$ of the reference point 22 of the driven gear tooth flank can be expressed as follows:

$$R_{GR} = R_{0G} - h_G/2 + \Delta h,$$

where $\Delta h$ represents the modification in the radius of the reference point 22 of driven gear 2, and the codomain of $\Delta h$ is between $-0.07\ h_G$ and $0.07\ h_G$, i.e. $\Delta h$ can be any value between $-0.07\ h_G$ and $0.07\ h_G$, for example the values can be chosen as $-0.07\ h_G$, $-0.05\ h_G$, $-0.03\ h_G$, $0.02\ h_G$, $0.05\ h_G$, $0.07\ h_G$ and so on.

In order to reduce the sensitivity of the performance of the gear pair to its mounting errors, the said upper tooth profile 25 and lower tooth profile 24 of the driven gear 2 have the same tangent and tooth profile curvature at the split point, i.e. the reference point 22 on the tooth flank, as illustrated in FIG. 3, that means the tooth profiles of the upper tooth profile and the lower tooth profile of the driven gear 2 are second order continuous at the reference point 22, composing a smooth and complete curve of the driven gear tooth flank. The upper tooth profile 15 and lower tooth profile 14 of the driving gear 1 also has the same tangent and tooth profile curvature at split point, i.e. the reference point 12 on the tooth flank, that means the tooth profiles of the upper tooth profile and the lower tooth profile of the driving gear are also second order continuous at the reference point 12, composing a smooth and complete curve of the driving gear tooth flank.

For present invention, the tooth profile curvature pp of the driving gear 1 can be calculated using an equation as follow:

$$\frac{1}{\rho_P} = \frac{\overline{P}_{12} \cdot \overline{P}_{12}}{S_{12}} - \frac{1}{\rho_G}$$

where $\rho_G$ represents the curvature radius of the driven gear tooth flank at the reference point 22, $\overline{P}_{12}$ represents a vector on the tooth flank and perpendicular to the instantaneous contact line, $s_{12}$ represents a coefficient, $$\overline{P}_{12} = \overline{n} \times \overline{\omega}_{12} - \overline{v}_{12}/\rho_G$$

$$s_{12} = \overline{v}_{12} \cdot \overline{P}_{12} + \overline{n} \cdot \overline{q}_{12}$$

where $$\overline{q}_{12} = \epsilon \overline{a}_1 \times \overline{R}_P + \overline{\omega}_{12} \times (\omega_2 \overline{a}_2 \times \overline{R}_G) - \overline{a}_2 \times \overline{v}_{12},$$

in which $\overline{v}_{12}$ represents the relative sliding speed between tooth flanks, $$\overline{v}_{12} = \overline{a}_1 \times \overline{R}_P - \omega_2 \overline{a}_2 \times \overline{R}_G,$$

where $\overline{a}_1$ and $\overline{a}_2$ respectively represent the unit vectors of driving and driven gear axes, $\omega_2$ represents the instantaneous angular speed of the driven gear 2 with respect to the driving gear 1 when the reference point 12 and 22 are in contact, where $\omega_2 = N_P/N_G$, $N_P$ represents the number of teeth in driving gear 1, while $N_G$ represents the number of teeth in driven gear 2, $$\bar{\omega}_{12} = \bar{a}_1 - \omega_2 \bar{a}_2,$$

where $\bar{\omega}_{12}$ represents the relative angular velocity between the driving gear 1 and driven gear 2.

For present invention, since there is a crowing in tooth profiles, when the contact between the gear flanks is out of the reference points, the instantaneous gear ratio of the gear pair is a little different from the reciprocal of the ratio of the number of teeth in gear pair, i.e. the driven gear has an angular acceleration $\epsilon$ with respect to the driving gear. To obtain required crowning, when the contact between the driving and driven gears is out of the reference points 12 and 22, the instantaneous gear ratio $\omega_2$ should be:

$$\omega_2 = \phi_P \cdot N_P/N_G + \epsilon \cdot \phi_P^2/2.$$

where $\epsilon$ represents the angular acceleration of the driven gear 2 relative to the driving gear 1, $\phi_P$ represents the angle of rotation of the driving gear 1.

To ensure a convex profile, $\epsilon$ must be a negative value, while its absolute value will generally increase together with the increment in the number of teeth in driving gear 1. The domain of said angular acceleration $\epsilon$ of the driven gear with respect to driving gear is between 0 and −0.0015, can be chosen in accordance to requirement within the domain, for instance, 0, −0.001, −0.0012, −0.0015 and so on.

For present invention, as a preferred example, the convex analytic curves with which the lower part tooth profile 14 or 24 of either driving gear 1 or driven gear 2 is composed can be a piece of single convex analytic curve. The single convex analytic curve can be a circular or elliptic arc.

For present invention, as another preferred example, the convex analytic curves with which the lower part tooth profile 14 or 24 of either driving gear 1 or driven gear 2 can also be composed by two pieces of analytic curves. Concretely, it can be composed by a circular arc and its tangent, or composed by an elliptic arc and its tangent. As the example for illustrating here, only the situation that tooth profiles are composed of circular arc and its tangent is illustrated in FIGS. 1-3. The split point between two pieces of analytic curves should be beneath the working area of tooth profile, thus the root width is increased and bending strength is improved, while the working situation and sensitivity to mounting errors were kept unchanged.

In the profile forming method as mentioned above, if the lower profile 14 of driving gear 1 is a circular arc, the convex analytic curve of lower profile 14 of the driving gear 1 is uniquely determined by above mentioned three parameters in step 2). On the other hand, if the lower profile 14 of the driving gear 1 is an elliptic arc, some other parameters needs to be predetermined, for instance, the ratio between the major and minor axes, the parameter of the ellipse corresponding to the reference point, so that the convex analytic curve which composes the lower profile of the driving gear can be determined.

A comparison between concrete examples is presented below to demonstrate present invention.

The required gear ratio is about 0.7, and the center distance of the gear pair is 85 mm.

According to present invention, the number of teeth $N_P$ in driving gear 1 is 7, while the number of teeth $N_G$ in driven gear 2 is 10. The tip diameter of the driving gear is 45.05 mm, and its root diameter is 24.3 mm. The tip diameter of the driven gear is 58.45 mm, and its root diameter is 37.95 mm. When the tooth flanks of the driving gear 1 and driven gear 2 get into contact at their reference points, the angular acceleration of the driven gear 2 with respect to driving gear 1 is −0.0004. The lower tooth profile 14 of the driving gear 1 is composed of a circular arc with a radius of 17.536 mm and its tangent beneath effective working area, while the lower tooth profile 24 of the driven gear 2 is composed of a circular arc with a radius of 22.307 mm and its tangent beneath effective working area. At the reference points 12 and 22 the pressure angle of the gear pair is 28.5°. The upper tooth profile 15 of the driving gear 1 and the upper tooth profile 25 of driven gear 2 are calculated by a series of points in accordance with engagement equation and given kinematical regularity. The end views are illustrated in FIG. 2 and FIG. 3 respectively.

As a comparison, a gear pair with involute tooth profiles is designed. Limited by undercut, a ratio in the number of teeth 7:10 cannot realize, therefore a ratio of 10:14 is used instead. To increase its load capacity, a larger pressure angle of 25° and a short addendum profile with an addendum factor 0.8 are adopted for the gear pair, and radial straight line is used for the tooth profile inside the base circle to avoid undercut. Even though above methods are adopted, the bending strength of the gear pair according to present invention is 25% higher than above mentioned involute gear pair, while the increment in contact strength of present invention is even more. Taking into account the increased pressure angle in the tooth profile towards the tip will reduce the tensile stress in root fillet, the improvement in fatigue strength may be even greater.

This embodiment demonstrates the great effectiveness of profile design method presented in this invention in the improvement of load capacity of heavy-duty gear pairs.

The structure of gear pairs and the method to form the tooth profile presented in this invention can be used for the bevel and cylindrical gears in automobile differential and cylindrical gear pairs in gearbox.

The parameters and calculated result presented above are used to demonstrate the invention only, but not used as a limitation to the invention.

The invention claimed is:

1. A gear pair for power transmission comprising: a pair of engaged driving and driven gears, profiles of the driving and driven gears being divided into upper and lower profiles relative to respective reference points, the reference point of the driven gear being located adjacent a middle point of an effective working depth of the gear pair, the reference point of the driving gear and the reference point of the driven gear being a pair of conjugate points, lower profiles of both the driving and driven gears are composed of smooth convex analytic curves, the upper profiles of both the driving and driven gears are composed of conjugate curves defined by a series of points obtained from an engagement equation based on kinematical regularity, the instantaneous gear ratio $\omega_2$ of the gear pair is expressed as:

$$\omega_2 = \phi_P \cdot N_P/N_G + \epsilon \cdot \phi_P^2/2$$

where $\epsilon$ represents angular acceleration of the driven gear relative to the driving gear, $\phi_P$ represents angle of rotation of the driving gear; $N_P$ represents a number of teeth in the driving gear and $N_G$ represents a number of teeth in the driven gear.

2. The gear pair according to claim 1, wherein a domain of the angular acceleration $\epsilon$ of the driven gear with respect to driving gear is between 0 and −0.0015.

3. The gear pair according to claim 1, wherein at least one of the convex analytic curves of the lower part tooth profile of either the driving or driven gear is composed of a single convex analytic curve.

4. The gear pair according to claim 3, wherein the single convex analytic curve comprises a circular or elliptic arc.

5. The gear pair according to claim 1, wherein the convex analytic curve of the lower part tooth profile of either the driving or driven gear is composed of two analytic curves.

6. The gear pair according to claim 5, wherein the convex analytic curve is composed by a circular arc and its tangent.

7. The gear pair according to claim 5, wherein a split point of the two analytic curves is beneath an effective working area of tooth profile.

8. The gear pair according to claim 5, wherein the convex analytic curve is composed by an elliptic arc and its tangent.

9. A gear pair for power transmission comprising: a pair of engaged driving and driven gears, profiles of the driving and driven gears being divided into upper and lower profiles relative to respective reference points, the reference point of the driven gear being located adjacent a middle point of an effective working depth of the gear pair, the reference point of the driving gear and the reference point of the driven gear being a pair of conjugate points, lower profiles of both the driving and driven gears are composed of smooth convex analytic curves, the upper profiles of both the driving and driven gears are composed of conjugate curves defined by a series of points obtained from an engagement equation based on kinematical regularity, wherein the tooth profile curvature $\rho_P$ is calculated by:

$$\frac{1}{\rho_P} = \frac{\overline{P}_{12} \cdot \overline{P}_{12}}{S_{12}} - \frac{1}{\rho_G},$$

where $\rho_G$ denotes a curvature radius of the driven gear tooth flank at the reference point, wherein $$\overline{P}_{12} = \overline{n} \times \overline{\omega}_{12} - \overline{v}_{12}/\rho_G$$

$$s_{12} = \overline{v}_{12} \cdot \overline{P}_{12} + \overline{n} \cdot \overline{q}_{12},$$

where $$\overline{q}_{12} = \epsilon \overline{a}_1 \times \overline{R}_P + \overline{\omega}_{12} \times (\omega_2 \overline{a}_2 \times \overline{R}_G) - \overline{a}_2 \times \overline{v}_{12},$$

wherein $\overline{P}_{12}$ represents a vector on the tooth flank, the vector being perpendicular to the instantaneous contact line; $s_{12}$ represents a coefficient, $\overline{n}$ represents a common unit normal to the reference points when they become a pair of contact points; $\epsilon$ represents the angular acceleration of the driven gear relative to the driving gear; $\overline{R}_G$ represents a position vector at the reference point on a tooth flank of the driven gear;
where $\overline{v}_{12}$ represents a relative sliding speed between tooth flanks, $$\overline{v}_{12} = \overline{a}_1 \times \overline{R}_P - \omega_2 \overline{a}_2 \times \overline{R}_G,$$

where $\overline{a}_1$ and $\overline{a}_2$ respectively represent unit vectors of the driving and driven gear axes, $\omega_2$ represents instantaneous angular speed of the driven gear with respect to the driving gear when the reference points are in contact, and $\overline{R}_P$ represents a position vector at the reference point on the tooth flank of the driving gear;
wherein $\omega_2 = N_P/N_G$,
$N_P$ represents a number of teeth in the driving gear, while $N_G$ represents a number of teeth in the driven gear, $$\overline{\omega}_{12} = \overline{a}_1 - \omega_2 \overline{a}_2,$$

where $\overline{\omega}_{12}$ represents a relative angular velocity between the driving and driven gears.

10. The gear pair according to claim 9, wherein the working depth $h_G$ of the gear pair is expressed as:

$$h_G = (R_{0G} + R_{0P} - A)/2,$$

where $R_{0G}$ represents a tip radius of the driven gear, $R_{0P}$ represents a tip radius of the driving gear, and A represents a center distance of the gear pair.

11. The gear pair according to claim 10, wherein a radius $R_{GR}$ of the reference point on a driven gear tooth flank is expressed as:

$$R_{GR} = R_{0G} - h_G/2 + \Delta h,$$

where $\Delta h$ represents a modification in a radius of the reference point of the driven gear, and a codomain of $\Delta h$ is between $-0.07\, h_G$ and $0.07\, h_G$.

12. The gear pair according to claim 9, wherein the curves of the upper and lower tooth profiles of the driven gear have a same tangent and tooth profile curvature at the reference point on the tooth flank of the driven gear.

13. The gear pair according to claim 9, wherein the curves of the upper and lower tooth profiles of the driving gear have the same tangent and tooth profile curvature at the reference point on the tooth flank of the driving gear.

14. The gear pair according to claim 9, wherein at least one of the convex analytic curves of the lower part tooth profile of either the driving or driven gear is composed of a single convex analytic curve.

15. The gear pair according to claim 14, wherein the single convex analytic curve comprises a circular or elliptic arc.

16. The gear pair according to claim 9, wherein at least one of the convex analytic curves of the lower part tooth profile of either the driving or driven gear is composed of two analytic curves.

17. The gear pair according to claim 16, wherein the convex analytic curve is composed by a circular arc and its tangent.

18. The gear pair according to claim 16, wherein a split point of the two analytic curves is beneath an effective working area of tooth profile.

19. The gear pair according to claim 16, wherein the convex analytic curve is composed by an elliptic arc and its tangent.

* * * * *

UNITED STATES PATENT AND TRADEMARK OFFICE
CERTIFICATE OF CORRECTION

PATENT NO. : 8,020,464 B2
APPLICATION NO. : 12/093177
DATED : September 20, 2011
INVENTOR(S) : Jiang et al.

It is certified that error appears in the above-identified patent and that said Letters Patent is hereby corrected as shown below:

Column 9, line 39 (claim 9), delete "where" and insert --wherein--.

Column 9, line 54 (claim 9), after "where" delete " $a,$ " and " $a,$ " and insert -- $a_1$ -- and -- $a_2$ --.

Signed and Sealed this
Tenth Day of January, 2012

David J. Kappos
*Director of the United States Patent and Trademark Office*